US009902394B2

(12) United States Patent
Mose et al.

(10) Patent No.: US 9,902,394 B2
(45) Date of Patent: Feb. 27, 2018

(54) VEHICLE BEHAVIOR INFORMATION ACQUISITION DEVICE AND VEHICLE TRAVEL CONTROL DEVICE

(71) Applicant: HONDA MOTOR CO., LTD., Tokyo (JP)

(72) Inventors: Ryota Mose, Wako (JP); Norifumi Tamura, Wako (JP); Katsuya Matsuzaki, Wako (JP); Yuta Okazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 15/011,754

(22) Filed: Feb. 1, 2016

(65) Prior Publication Data

US 2016/0221572 A1 Aug. 4, 2016

(30) Foreign Application Priority Data

Feb. 2, 2015 (JP) ................................ 2015-018725

(51) Int. Cl.
*B60W 30/045* (2012.01)
*B60W 40/105* (2012.01)
*B60T 8/1755* (2006.01)

(52) U.S. Cl.
CPC ....... *B60W 30/045* (2013.01); *B60T 8/17551* (2013.01); *B60W 40/105* (2013.01); *B60W 2520/10* (2013.01); *B60W 2520/14* (2013.01)

(58) Field of Classification Search
None
See application file for complete search history.

(56) References Cited

U.S. PATENT DOCUMENTS

2015/0191158 A1* 7/2015 Vorreiter ................ B60T 8/172 701/72

FOREIGN PATENT DOCUMENTS

JP 2002-122219 A 4/2002
JP 2010-137621 A 6/2010
(Continued)

OTHER PUBLICATIONS

Notification of Reasons for Refusal dated Sep. 20, 2016, issued in counterpart Japanese Patent Application No. 2015-018725, with English translation. (8 pages).

*Primary Examiner* — James M McPherson
(74) *Attorney, Agent, or Firm* — Westerman, Hattori, Daniels & Adrian, LLP

(57) ABSTRACT

A vehicle behavior information acquisition device includes: a neutral characteristic setting unit in which a vehicle velocity-neutral yaw rate characteristic where a behavior of a user's vehicle is supposed to be in a neutral state is previously set based on a vehicle velocity and a steering angle of the vehicle; and a behavior information acquisition unit for acquiring behavior information including an understeer state of the vehicle based on an actual yaw rate, a vehicle velocity, a steering angle, and a vehicle velocity-neutral yaw rate characteristic previously set in the neutral characteristic setting unit. The behavior information acquisition unit acquires behavior information indicating that the vehicle is in an understeer state in a case where a deviation between the actual yaw rate and a neutral yaw rate based on the vehicle velocity, the steering angle, and the vehicle velocity-neutral yaw rate characteristic exceeds a predetermined deviation threshold.

14 Claims, 4 Drawing Sheets

13 SENSOR GROUP
21 YAW RATE SENSOR
23 VEHICLE VELOCITY SENSOR
25 STEERING ANGLE SENSOR
27 LATERAL ACCELERATION SENSOR
11 VEHICLE TRAVEL CONTROL DEVICE
15 VEHICLE BEHAVIOR INFORMATION ACQUISITION DEVICE
31 NEUTRAL CHARACTERISTIC SETTING UNIT
33 BEHAVIOR INFORMATION ACQUISITION UNIT
29 CRUISE CONTROL SWITCH
35 TRAVEL CONTROL SECTION
30 NAVIGATION DEVICE
17 DRIVING ACTUATOR
19 BRAKE ACTUATOR

(56) References Cited

FOREIGN PATENT DOCUMENTS

| | | | |
|---|---|---|---|
| JP | 2011-79395 | A | 4/2011 |
| JP | 2013-067301 | A | 4/2013 |

* cited by examiner

VEHICLE BEHAVIOR INFORMATION ACQUISITION DEVICE AND VEHICLE TRAVEL CONTROL DEVICE

CROSS REFERENCES TO RELATED APPLICATIONS

The present application claims priority under 35 U.S.C. § 119 to Japanese Patent Application No. 2015-018725, filed Feb. 2, 2015, entitled "VEHICLE BEHAVIOR INFORMATION ACQUISITION DEVICE AND VEHICLE TRAVEL CONTROL DEVICE." The contents of this application are incorporated herein by reference in their entirety.

TECHNICAL FIELD

The present disclosure relates to a vehicle behavior information acquisition device for acquiring behavior information including an understeer state of a vehicle. The present disclosure also relates to a vehicle travel control device for performing travel control of the vehicle using behavior information acquired by a vehicle behavior information acquisition device.

BACKGROUND

There is a known technique for acquiring behavior information including an understeer state of a user's vehicle by determining whether the vehicle is in the understeer state based on a deviation between an actual motion state (actual yaw rate) of the vehicle and a motion state (model yaw rate) serving as a model of the vehicle (see, for example, Japanese Unexamined Patent Application Publication No. 2011-79395 (see paragraphs 0038 to 0039).

SUMMARY

However, in a vehicle behavior information acquisition technique according to Japanese Unexamined Patent Application Publication No. 2011-79395, a model yaw rate is calculated at an appropriate timing based on a vehicle velocity detected by a vehicle velocity sensor and a steering angle detected by a steering angle sensor. Here, the steering angle detected by the steering angle sensor is obtained based on the premise that the vehicle is in the state of trace running (i.e., running without skids) on a dry road surface. Thus, when a vehicle running on a dry road surface becomes an understeer state, it is difficult to acquire adequate behavior information including the understeer state of the vehicle.

The present disclosure has been made in view of the foregoing problem, and one aspect provides a vehicle behavior information acquisition device that can acquire adequate behavior information including an understeer state of a vehicle even when the vehicle is in the understeer state.

Another aspect also provides a vehicle travel control device that can appropriately perform travel control of a vehicle using behavior information acquired by the vehicle behavior information acquisition device.

In first aspect of the present disclosure, a major feature of a vehicle behavior information acquisition device is to include: a neutral characteristic setting unit in which a vehicle velocity-neutral yaw rate characteristic where a behavior of a vehicle is supposed to be in a neutral state is previously set based on a vehicle velocity and a steering angle of the vehicle; and a behavior information acquisition unit for acquiring behavior information including an understeer state of the vehicle based on an actual yaw rate detected by an actual yaw rate detecting unit, a vehicle velocity detected by a vehicle velocity detecting unit, a steering angle detected by a steering angle detecting unit, and a vehicle velocity-neutral yaw rate characteristic previously set in the neutral characteristic setting unit, wherein the behavior information acquisition unit acquires behavior information indicating that the vehicle is in an understeer state in a case where a deviation between the actual yaw rate and a neutral yaw rate calculated based on the vehicle velocity, the steering angle, and the vehicle velocity-neutral yaw rate characteristic exceeds a predetermined deviation threshold.

In the first aspect, in the neutral characteristic setting unit, the vehicle velocity-neutral yaw rate characteristic in which a behavior of the vehicle is supposed to be in a neutral state is previously set based on the vehicle velocity and the steering angle of a vehicle. The behavior information acquisition unit acquires behavior information indicating that the vehicle is in an understeer state in a case where the deviation between the actual yaw rate and the neutral yaw rate based on the vehicle velocity, the steering angle, and the vehicle velocity-neutral yaw rate characteristic exceeds the deviation threshold.

Thus, in the first aspect, even in a case where a vehicle running on a dry road surface becomes an understeer state, adequate behavior information including an understeer state of the vehicle can be acquired.

In a second aspect of the present disclosure, in the vehicle behavior information acquisition device of the first aspect, the vehicle velocity-neutral yaw rate characteristic previously set in the neutral characteristic setting unit may be a linear characteristic passing through an origin where the vehicle velocity is zero and the neutral yaw rate is zero.

In the second aspect, behavior information is acquired using the vehicle velocity-neutral yaw rate characteristic, and thus, adequate behavior information in conformity with a variation of the vehicle velocity can be acquired without disorder in the conformity.

In a third aspect of the present disclosure, a major feature of a vehicle travel control device is to include: a neutral characteristic setting unit in which a vehicle velocity-neutral yaw rate characteristic where a behavior of a vehicle is supposed to be in a neutral state is previously set based on a vehicle velocity and a steering angle of the vehicle; a behavior information acquisition unit for acquiring behavior information including an understeer state of the vehicle based on an actual yaw rate detected by an actual yaw rate detecting unit, a vehicle velocity detected by a vehicle velocity detecting unit, a steering angle detected by a steering angle detecting unit, and a vehicle velocity-neutral yaw rate characteristic previously set in the neutral characteristic setting unit; and a travel control section for performing travel control so that the vehicle velocity of the vehicle follows a predetermined vehicle velocity, wherein the behavior information acquisition unit acquires behavior information indicating that the vehicle is in an understeer state in a case where a deviation between the actual yaw rate and a neutral yaw rate based on the vehicle velocity, the steering angle, and the vehicle velocity-neutral yaw rate characteristic exceeds a predetermined deviation threshold, and the travel control section performs travel control of the vehicle using the behavior information acquired by the behavior information acquisition unit.

In the third aspect, the vehicle velocity-neutral yaw rate characteristic in which a behavior of the vehicle is supposed to be in a neutral state is previously set in the neutral characteristic setting unit based on the vehicle velocity and the steering angle of the vehicle. The behavior information acquisition unit acquires behavior information indicating that the vehicle is in an understeer state in a case where the deviation between the actual yaw rate and the neutral yaw rate calculated based on the vehicle velocity, the steering angle, and the vehicle velocity-neutral yaw rate characteristic exceeds the predetermined deviation threshold. The travel control section performs travel control of the vehicle using behavior information acquired by the behavior information acquisition unit.

Thus, in the third aspect, even when a vehicle running on a dry road surface becomes an understeer state, adequate behavior information including an understeer state of the vehicle can be acquired, and travel control of the vehicle can be appropriately performed using the thus-acquired behavior information.

In a fourth aspect of the present disclosure, in the vehicle travel control device of the third aspect, the travel control section may perform travel control of decelerating the vehicle to a vehicle velocity with which the deviation between the actual yaw rate and the neutral yaw rate follows the deviation threshold in a case where the deviation exceeds the deviation threshold.

In the fourth aspect, the travel control section performs travel control of decelerating the vehicle to a vehicle velocity with which the deviation between the actual yaw rate and the neutral yaw rate follows the deviation threshold in a case where the deviation exceeds the deviation threshold. Thus, in applying the present disclosure to an auto-cruising system, travel control with stable behavior of the vehicle can be achieved by suppressing an understeer state of a vehicle running on a dry road surface.

In a fifth aspect, in the vehicle travel control device of the fourth aspect, the travel control section may perform travel control of accelerating the vehicle so that the vehicle velocity follows a predetermined vehicle velocity in a case where the vehicle is in a straight-ahead state.

In the fifth aspect, the travel control section performs travel control of accelerating the vehicle so that the vehicle velocity follows a predetermined vehicle velocity in a case where the vehicle is in a straight-ahead state. Thus, in applying the present disclosure to an auto-cruising system, travel control suitable for a travel scene that is always changing can be obtained.

According to one embodiment of the present disclosure, even in a case where a vehicle running on a dry road surface becomes an understeer state, adequate behavior information including an understeer state of the vehicle can be acquired.

BRIEF DESCRIPTION OF THE DRAWINGS

The advantages of the disclosure will become apparent in the following description taken in conjunction with the following drawings.

DETAILED DESCRIPTION

A vehicle travel control device 11 including a vehicle behavior information acquisition device 15 according to an embodiment of the present disclosure will be described with reference to the drawings.

[Configuration of Vehicle Travel Control Device 11 Including Vehicle Behavior Information Acquisition Device 15]

Figure 1:
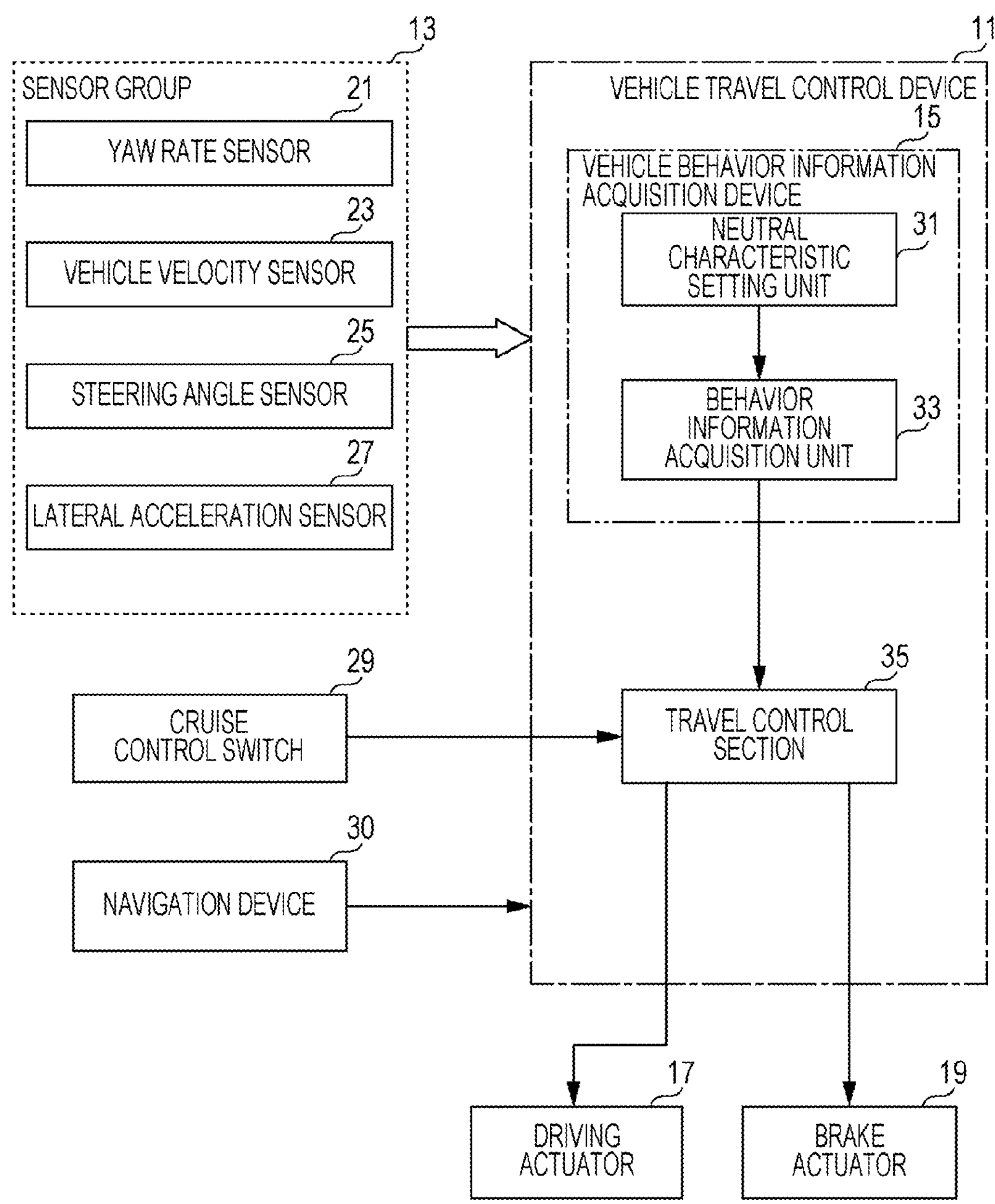
FIG. 1 is a functional block diagram illustrating vehicle travel control device including a vehicle behavior information acquisition device according to an embodiment of the present disclosure and peripheral components thereof.

First, a configuration of the vehicle travel control device 11 including the vehicle behavior information acquisition device 15 according to the embodiment of the present disclosure will be described with reference to FIG. 1. FIG. 1 is a functional block diagram illustrating the vehicle travel control device 11 including the vehicle behavior information acquisition device 15 according to the embodiment of the present disclosure and peripheral components thereof.

As illustrated in FIG. 1, the vehicle travel control device 11 according to the embodiment of the present disclosure is connected to a sensor group 13, a driving actuator 17, a brake actuator 19, a cruise control switch 29, and a navigation device 30. As illustrated in FIG. 1, the sensor group 13 includes a yaw rate sensor 21, a vehicle velocity sensor 23, a steering angle sensor 25, and a lateral acceleration sensor 27.

The yaw rate sensor 21 has a function of detecting an actual yaw rate (a change rate of a rotation angle in a cornering direction) of a user's vehicle (not shown). The yaw rate sensor 21 corresponds to an "actual yaw rate detecting unit" of the present disclosure. The vehicle velocity sensor 23 has a function of detecting the speed of a user's vehicle (hereinafter referred to as a "vehicle velocity"). The vehicle velocity sensor 23 corresponds to a "vehicle velocity detecting unit" of the present disclosure. The steering angle sensor 25 has a function of detecting a steering angle of front wheels (not shown) serving as steering wheels. The steering angle sensor 25 corresponds to a "steering angle detecting unit" of the present disclosure. The lateral acceleration sensor 27 has a function of detecting an acceleration (a lateral acceleration) generated in a lateral direction when a user's vehicle makes a turn, for example.

As illustrated in FIG. 1, the vehicle travel control device 11 includes the behavior information acquisition device 15 and a travel control section 35. For example, the vehicle travel control device 11 constituted by a microcomputer includes, for example, an unillustrated central processing unit (CPU), a read only memory (ROM), and a random access memory (RAM). This microcomputer reads out a program stored in a ROM, executes the program, and performs execution control for functions including a vehicle behavior information acquisition function and a travel control function of the vehicle travel control device 11. As illustrated in FIG. 1, the vehicle behavior information acquisition device 15 includes a neutral characteristic setting unit 31 and a behavior information acquisition unit 33.

Figure 2:
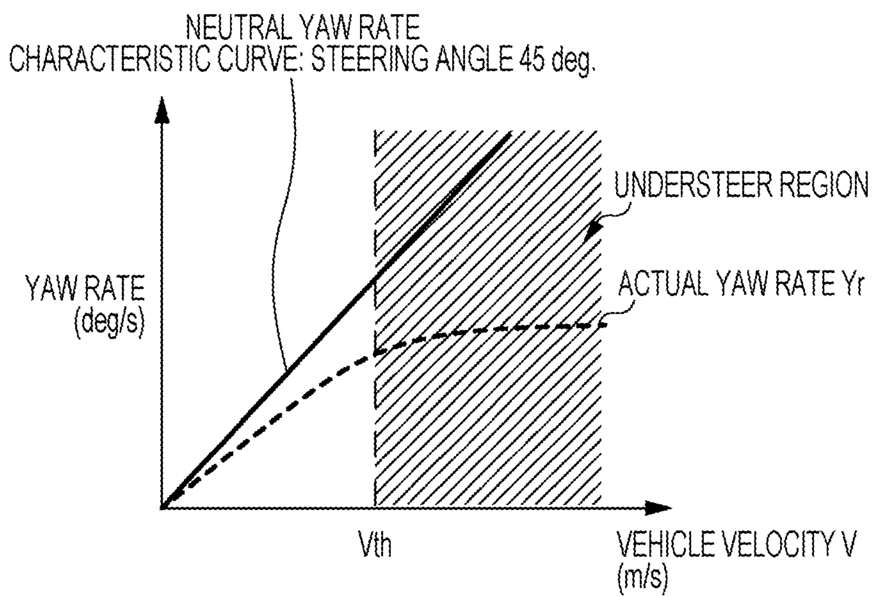
FIG. 2 is a graph showing an aspect of a neutral yaw rate characteristic previously set in a neutral characteristic setting unit.
Figure 3:
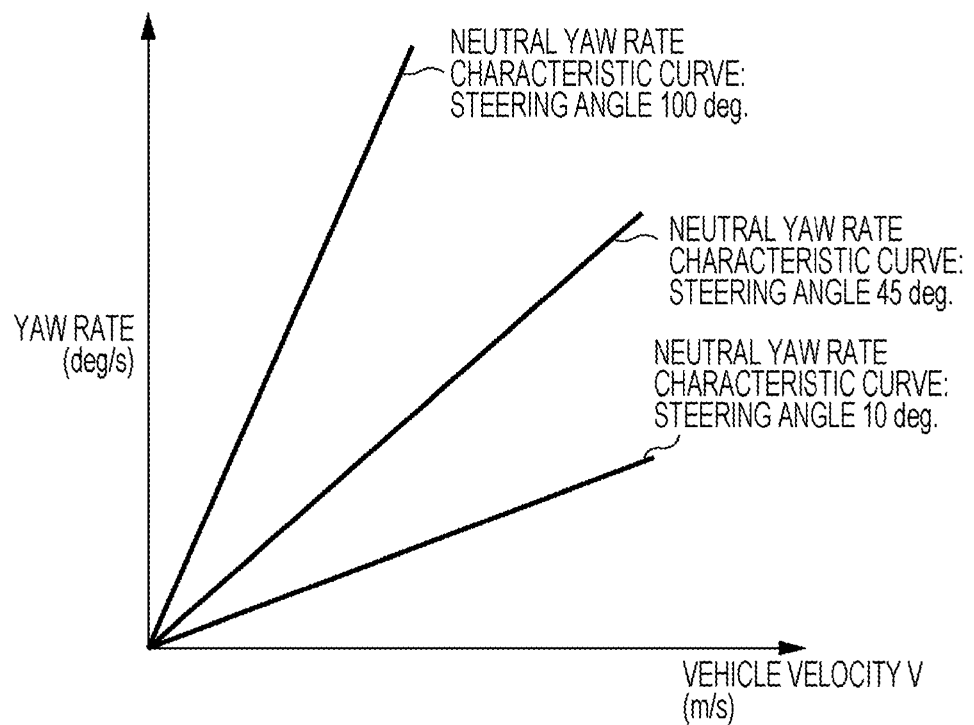
FIG. 3 is a conceptual graph showing that a neutral yaw rate characteristic chart is set for each of different steering angles.
Figure 4:
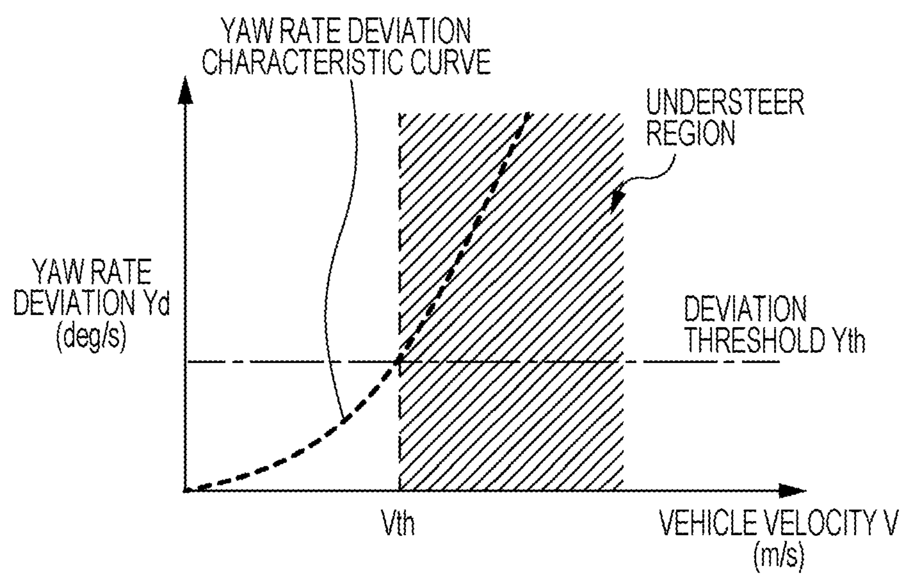
FIG. 4 is a conceptual graph showing that a vehicle becomes an understeer state when a deviation between an actual yaw rate and a neutral yaw rate exceeds a deviation threshold Yth.

The neutral characteristic setting unit 31 has a function of previously setting a vehicle velocity-neutral yaw rate characteristic in which a behavior of a user's vehicle is supposed to be in a neutral state based on a vehicle velocity and a steering angle of the user's vehicle. The vehicle velocity-neutral yaw rate characteristic will now be described with reference to FIGS. 2 through 4. FIG. 2 is a graph showing an aspect of a neutral yaw rate characteristic previously set in the neutral characteristic setting unit 31. FIG. 3 is a conceptual graph showing that a neutral yaw rate characteristic chart is set for each of different steering angles. FIG. 4 is a conceptual graph showing that a user's vehicle becomes an understeer state when a deviation Yd between an actual yaw rate Yr and a neutral yaw rate Yn exceeds a deviation threshold Yth.

The vehicle velocity-neutral yaw rate characteristic chart shown in FIG. 2 represents a neutral yaw rate characteristic with respect to a change in the vehicle velocity in a case where the steering angle is 45 degrees, for example. This vehicle velocity-neutral yaw rate characteristic is a linear characteristic passing through an origin where the vehicle velocity V is zero and the neutral yaw rate Yn is zero. In the example of the vehicle velocity-neutral yaw rate characteristic chart shown in FIG. 2, when the vehicle velocity V exceeds the vehicle velocity deviation threshold Vth, the deviation Yd between the actual yaw rate Yr and the neutral yaw rate Yn exceeds the deviation threshold Yth (see FIG. 4) so that the user's vehicle becomes an understeer state.

As illustrated in FIG. 3, the vehicle velocity-neutral yaw rate characteristic chart is set for each of different steering angles (e.g., 10 degrees, 45 degrees, and 100 degrees, where the steering angles may be defined in optional stages). That is, the neutral yaw rate Yn can be expressed as a function of the vehicle velocity V and the steering angle θ:

$$Yn=-\alpha\theta\beta V \quad \text{(Equation 1)}$$

In Equation 1, α is a steering angle gain for assigning weights to the steering angle θ (whether importance is placed on the steering angle θ or not). The steering angle gain α may be set at an appropriate value in consideration of weights assigned to the steering angle θ.

In Equation 1, β is a vehicle velocity gain for assigning weights to the vehicle velocity V (whether importance is placed on the vehicle velocity V or not). The vehicle velocity gain β may be set at an appropriate value in consideration of weights assigned to the vehicle velocity V.

The behavior information acquisition unit 33 has a function of acquiring behavior information including an understeer state of the user's vehicle based on an actual yaw rate Yr detected by the yaw rate sensor 21, a vehicle velocity detected by the vehicle velocity sensor 23, a steering angle detected by the steering angle sensor 25, and a vehicle velocity-neutral yaw rate characteristic previously set in the neutral characteristic setting unit 31. More specifically, the behavior information acquisition unit 33 operates to acquire behavior information indicating that the user's vehicle is in an understeer state in a case where the deviation Yd between the actual yaw rate Yr and the neutral yaw rate Yn based on the vehicle velocity, the steering angle, and the vehicle velocity-neutral yaw rate characteristic exceeds the predetermined deviation threshold Yth (see FIG. 4).

The travel control section 35 has a function of performing travel control including braking of the user's vehicle using the behavior information acquired by the behavior information acquisition unit 33. More specifically, the travel control section 35 performs travel control (brake control) of decelerating the vehicle so that the deviation Yd follows the deviation threshold Yth in a case where the cruise control switch 29 operated in turning on or off a cruise control system (not shown) for performing cruise control of the user's vehicle to maintain a predetermined vehicle velocity is on and where the deviation Yd between the actual yaw rate Yr and the neutral yaw rate Yn exceeds the deviation threshold Yth.

The travel control section 35 performs travel control of accelerating the vehicle so that the vehicle velocity of the user's vehicle follows a predetermined vehicle velocity in a case where the travel control section 35 acquires travel route information indicating that the user's vehicle is in a straight-ahead state (i.e., after cornering) from the navigation device 30.

Thus, the travel control section 35 has a function of controlling a driving force for allowing the user's vehicle to run. The travel control section 35 is connected to the driving actuator 17 for operating a mechanical element for applying a driving force to the user's vehicle. Examples of the mechanical element for applying a driving force to the user's vehicle include a throttle valve and an intake valve (each not shown) for controlling the amount of air to be sucked into an unillustrated engine. The travel control section 35 can control the amount of air to be sucked into the engine, that is, a driving force, by adjusting the opening degree of the throttle valve and/or adjusting the lifting amount of the intake valve.

The travel control section 35 also has a function of controlling a braking force for reducing the velocity of the user's vehicle. To achieve the function, the travel control section 35 is connected to the brake actuator 19 for operating a mechanical element for applying a braking force to the user's vehicle. Examples of the mechanical element for applying a braking force to the user's vehicle include a hydraulic-pressure braking device (not shown) and a motor-driven parking brake (not shown). The travel control section 35 can control a braking force of the user's vehicle by adjusting a hydraulic pressure of the hydraulic-pressure braking device and/or adjusting an on/off operation of the motor-driven parking brake.

The travel control section 35 may be configured to control an engine brake (in the case of including an internal combustion engine as a drive source) and a regenerative brake (in the case of including a motor as a drive source). In this case, the travel control section 35 can control an engine brake by using adjustment of the opening degree of the throttle valve by the brake actuator 19 and/or adjustment of the lifting amount of the intake valve. The travel control section 35 can control the regenerative brake by using adjustment of rotational speed of the motor by the brake actuator 19.

The travel control section 35 may be, for example, a vehicle stability assist device for assisting stable behavior of the user's vehicle.

[Basic Operation of Vehicle Travel Control Device 11 according to Embodiment of Present Disclosure]

Figure 5:
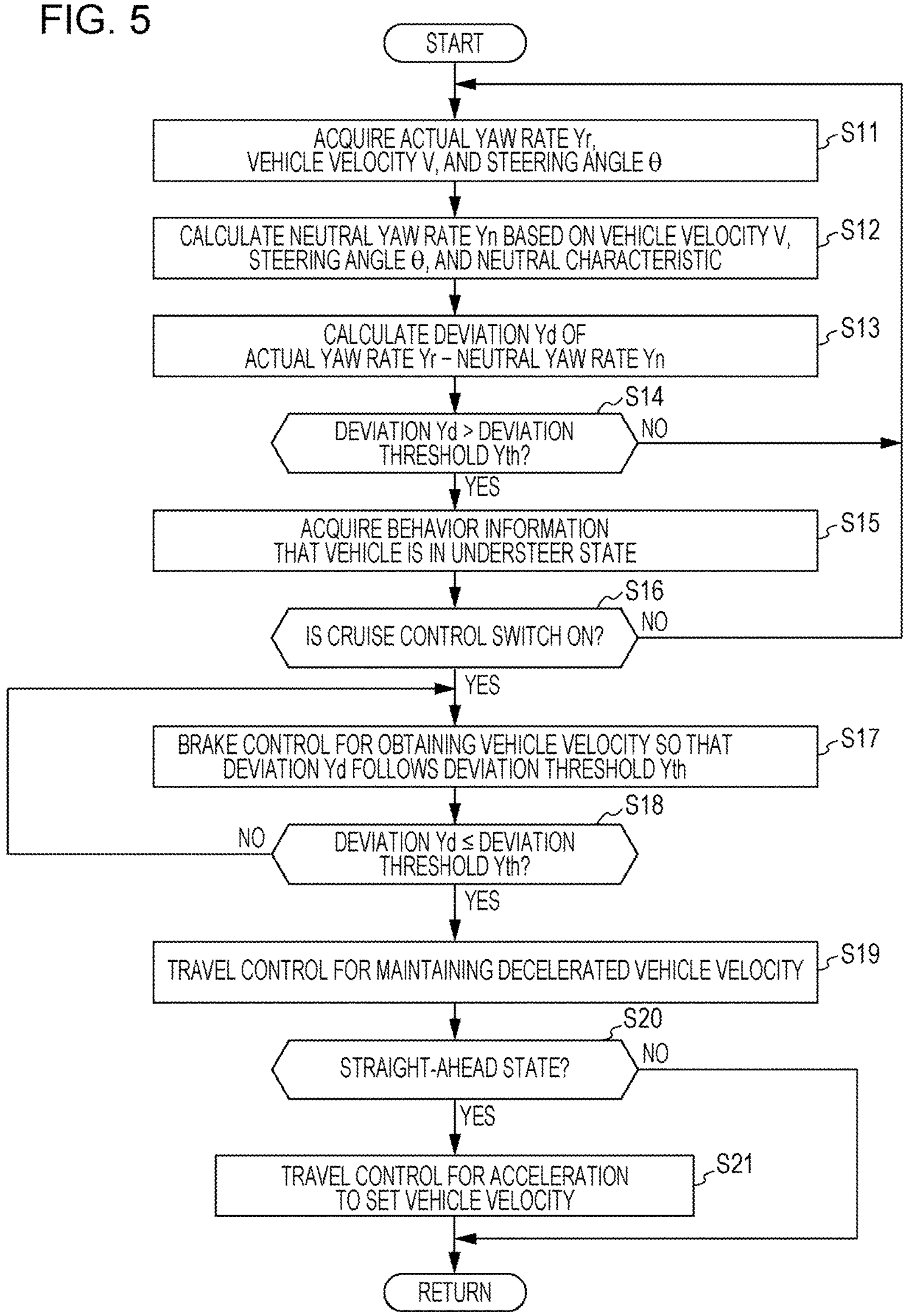
FIG. 5 is a flowchart for describing an operation of the vehicle travel control device according to the embodiment of the present disclosure.

A basic operation of the vehicle travel control device 11 according to the embodiment of the present disclosure will be described with reference to FIG. 5. FIG. 5 is a flowchart for describing an operation of the vehicle travel control device 11 according to the embodiment of the present disclosure.

In step S11 shown in FIG. 5, the vehicle travel control device 11 acquires an actual yaw rate Yr detected by the yaw rate sensor 21, a vehicle velocity detected by the vehicle velocity sensor 23, a steering angle detected by the steering angle sensor 25, data from the sensor group 13, such as a lateral acceleration, detected by the lateral acceleration sensor 27.

In step S12, the vehicle behavior information acquisition device 15 calculates a neutral yaw rate Yn corresponding to a current vehicle velocity and a current steering angle based on a vehicle velocity, a steering angle, and a vehicle velocity-neutral yaw rate characteristic previously set in the neutral characteristic setting unit 31.

In step S13, the vehicle behavior information acquisition device 15 calculates an absolute value (hereinafter simply referred to as a "deviation") Yd of a deviation between the actual yaw rate Yr detected by the yaw rate sensor 21 in step S11 and the neutral yaw rate Yn calculated in the step S12.

$$Yd = |\text{neutral yaw rate } Yn - \text{actual yaw rate } Yr| \quad \text{(Equation 2)}$$

In step S14, the vehicle behavior information acquisition device 15 determines whether the deviation Yd between the actual yaw rate Yr and the neutral yaw rate Yn exceeds the predetermined deviation threshold Yth or not.

As a result of the determination in step S14, if the deviation Yd is determined to be less than or equal to the deviation threshold Yth (see "No" in step S14), that is, if the user's vehicle is not in an understeer state, the vehicle behavior information acquisition device 15 returns the process to step S11, and performs processes subsequent to step S11.

On the other hand, as a result of the determination in step S14, if the deviation Yd is determined to exceed the deviation threshold Yth (see "Yes" in step S14), that is, if it is supposed that the user's vehicle is in an understeer state, the vehicle behavior information acquisition device 15 proceeds to next step S15. In step S15, the behavior information acquisition unit 33 of the vehicle behavior information acquisition device 15 acquires behavior information indicating that the user's vehicle is in an understeer state. In step S16, the vehicle travel control device 11 determines whether the cruise control switch 29 is on or not.

As a result of the determination in step S16, if it is determined that the cruise control switch 29 is not on (see "No" in step S16), that is, if travel control based on behavior information is unnecessary, the vehicle travel control device 11 returns the process to step S11, and performs processes subsequent to step S11.

On the other hand, as a result of the determination in step S16, if it is determined that the cruise control switch 29 is on (see "Yes" in step S16), that is, if travel control based on behavior information is required, the vehicle travel control device 11 proceeds to next step S17.

In step S17, the travel control section 35 of the vehicle travel control device 11 performs travel control (brake control) of decelerating the vehicle to a vehicle velocity V with which the deviation Yd follows the deviation threshold Yth.

In step S18, the vehicle behavior information acquisition device 15 determines whether the deviation Yd after the travel control (brake control) in step S17 is converged to the deviation threshold Yth or less.

As a result of the determination in step S18, if it is determined that the deviation Yd exceeds the deviation threshold Yth (see "No" in step S18), that is, if the user's vehicle is in an understeer state, the vehicle behavior information acquisition device 15 of the vehicle travel control device 11 returns the process to step S17, and performs the travel control (brake control) in step S17.

On the other hand, as a result of the determination in step S18, if it is determined that the deviation Yd has converged to the deviation threshold Yth or less (see "Yes" in step S18), that is, if the understeer state of the user's vehicle is canceled, the vehicle behavior information acquisition device 15 of the vehicle travel control device 11 proceeds to next step S19.

In step S19, the travel control section 35 of the vehicle travel control device 11 performs travel control of maintaining the vehicle velocity decelerated by the travel control (brake control) in step S17.

In step S20, the travel control section 35 of the vehicle travel control device 11 determines whether the user's vehicle is in a straight-ahead state or not based on whether the actual yaw rate Yr is less than or equal to a predetermined value (that is used in determining whether the user's vehicle is in a straight-ahead state or not). Specifically, the travel control section 35 determines that the user's vehicle is in a straight-ahead state if the actual yaw rate Yr is less than or equal to the predetermined value. The travel control section 35 may determine whether the user's vehicle is in the straight-ahead state or not with reference to travel route information sequentially sent from the navigation device 30.

As a result of the determination in step S20, if it is determined that the user's vehicle is not in a straight-ahead state (see "No" in step S20), that is, if the user's vehicle is making a turn, the travel control section 35 of the vehicle travel control device 11 returns the process to step S11, and performs processes subsequent to step S11.

On the other hand, as a result of the determination in step S20, if it is determined that the user's vehicle is in a straight-ahead state (see "Yes" in step S20), the travel control section 35 of the vehicle travel control device 11 processes to next step S21.

In step S21, the travel control section 35 of the vehicle travel control device 11 performs travel control of accelerating the vehicle to a predetermined vehicle velocity. Thereafter, the travel control section 35 of the vehicle travel control device 11 returns the process to step S11, and performs processes subsequent to step S11.

[Advantages of Vehicle Behavior Information Acquisition Device 15 according to Embodiment of Present Disclosure]

Advantages of the vehicle behavior information acquisition device 15 according to the embodiment of the present disclosure will be described. The vehicle behavior information acquisition device 15 according to the embodiment of the present disclosure includes: a neutral characteristic setting unit 31 in which a vehicle velocity-neutral yaw rate characteristic where a behavior of a user's vehicle is supposed to be in a neutral state is previously set based on a vehicle velocity and a steering angle of the vehicle; and a behavior information acquisition unit 33 for acquiring behavior information including an understeer state of the user's vehicle based on an actual yaw rate Yr detected by the yaw rate sensor (actual yaw rate detecting unit) 21, a vehicle velocity detected by the vehicle velocity sensor (vehicle velocity detecting unit) 23, a steering angle detected by the steering angle sensor (steering angle detecting unit) 25, and a vehicle velocity-neutral yaw rate characteristic previously set in the neutral characteristic setting unit 31.

The behavior information acquisition unit 33 acquires behavior information indicating that the user's vehicle is in an understeer state in a case where a deviation Yd between the actual yaw rate Yr, and a neutral yaw rate Yn based on the vehicle velocity, the steering angle, and the vehicle velocity-neutral yaw rate characteristic exceeds a deviation threshold Yth.

Thus, the vehicle behavior information acquisition device 15 according to the embodiment of the present disclosure can acquire adequate behavior information including an understeer state of the vehicle even in a case where a vehicle running on a dry road surface becomes an understeer state.

In the vehicle behavior information acquisition device 15 according to the embodiment of the present disclosure, the vehicle velocity-neutral yaw rate characteristic previously set in the neutral characteristic setting unit 31 is not specifically limited, and may be a linear characteristic passing through an origin where the vehicle velocity V is zero and the neutral yaw rate Yn is zero.

With this configuration, the behavior information acquisition unit 33 acquires behavior information using the vehicle velocity-neutral yaw rate characteristic passing through the origin where the vehicle velocity V is zero and the neutral yaw rate Yn is zero. Thus, adequate behavior information without disorder in conformity with a variation of the vehicle velocity can be acquired.

[Advantages of Vehicle Travel Control Device 11 according to Embodiment of Present Disclosure]

Advantages of the vehicle travel control device 11 according to the embodiment of the present disclosure will be described. The vehicle travel control device 11 according to the embodiment of the present disclosure includes: the neutral characteristic setting unit 31 in which a vehicle velocity-neutral yaw rate characteristic where a behavior of the user's vehicle is supposed to be in a neutral state is previously set based on a vehicle velocity V and a steering angle θ of the vehicle; the behavior information acquisition unit 33 for acquiring behavior information including an understeer state of a user's vehicle based on an actual yaw rate Yr detected by the yaw rate sensor (actual yaw rate detecting unit) 21, a vehicle velocity V detected by the vehicle velocity sensor (vehicle velocity detecting unit) 23, a steering angle θ detected by the steering angle sensor (steering angle detecting unit) 25, and a vehicle velocity-neutral yaw rate characteristic previously set in the neutral characteristic setting unit 31; and the travel control section 35 for performing travel control so that the vehicle velocity V of the user's vehicle follows a predetermined vehicle velocity.

The behavior information acquisition unit 33 acquires behavior information indicating that the user's vehicle is in an understeer state in a case where a deviation Yd between the actual yaw rate Yr and a neutral yaw rate Yn based on the vehicle velocity V, the steering angle θ, and the vehicle velocity-neutral yaw rate characteristic exceeds a predetermined deviation threshold Yth. The travel control section 35 performs travel control of the user's vehicle using the behavior information acquired by the behavior information acquisition unit 33.

Thus, the vehicle travel control device 11 according to the embodiment of the present disclosure can acquire adequate behavior information including an understeer state of a vehicle and can appropriately perform travel control of the vehicle using the thus-acquired behavior information even in a case where a vehicle running on a dry road surface becomes an understeer state.

In the vehicle travel control device 11 according to the embodiment of the present disclosure, the travel control section 35 may be configured to perform travel control of decelerating the vehicle to the vehicle velocity V with which the deviation Yd follows the deviation threshold Yth in a case where the deviation Yd between the actual yaw rate Yr and the neutral yaw rate Yn exceeds the deviation threshold Yth. Here, the vehicle velocity V with which the deviation Yd follows the deviation threshold Yth means a vehicle velocity V in a range where the deviation Yd does not exceed the deviation threshold Yth and the values of the deviation Yd and the deviation threshold Yth approach each other (including a case where the values of the deviation Yd and the deviation threshold Yth coincide with each other).

With this configuration, in application of this configuration to an auto-cruising system, travel control with a stable behavior of a vehicle can be obtained by suppressing an understeer state of a vehicle running on a dry road surface.

In the vehicle travel control device 11 according to the embodiment of the present disclosure, the travel control section 35 may be configured to perform travel control of accelerating the vehicle so that the vehicle velocity V of a user's vehicle follows a predetermined vehicle velocity in a case where the user's vehicle is in a straight-ahead state.

With this configuration, in application of this configuration to an auto-cruising system, travel control suitable for a travel scene that is always changing can be obtained.

[Other Embodiments]

The foregoing embodiment is an illustrative example of the present disclosure. Thus, the technical scope of the present disclosure should not be construed restrictively based on the embodiment. The present disclosure can be embodied in other various forms without departing from the spirit or major features thereof.

For example, in the embodiment of the present disclosure, the vehicle velocity-neutral yaw rate characteristic previously set in the neutral characteristic setting unit 31 has been described using graphs (see FIGS. 2 and 3) showing an aspect of a neutral yaw rate characteristic and a relational expression (Equation 1) of the neutral yaw rate Yn. However, the present disclosure is not limited to this example. The vehicle velocity-neutral yaw rate characteristic set by the neutral characteristic setting unit 31 may be an appropriate characteristic through, for example, a simulation or an actual vehicle running experiment.

In the example described in the embodiment of the present disclosure, the travel control section 35 acquires travel route information indicating that the user's vehicle is in a straight-ahead state either based on whether the actual yaw rate Yr is less than or equal to a predetermined value (that is used in determining whether the user's vehicle is in a straight-ahead state or not) or from the navigation device 30. However, the present disclosure is not limited to this example. For example, the configuration for acquiring travel route information indicating that the user's vehicle is in a straight-ahead state may be employed by analyzing a camera image obtained by a camera for capturing an image of the user's vehicle in the travelling direction.

In the example described in the embodiment of the present disclosure, the travel control section 35 performs travel control of the user's vehicle using the driving actuator 17 and the brake actuator 19 through drive control or brake control (including a combination of drive control and brake control) of these actuators. However, the present disclosure is not limited to this example. In the travel control section 35 according to the embodiment of the present disclosure, the travel control of the user's vehicle may be performed by appropriately performing torque allocation control and steering angle control on the wheels.

In the example described in the embodiment of the present disclosure, a value is used as the deviation threshold Yth for use in determining whether the vehicle is in an understeer state or not. However, the present disclosure is not limited to this example. For example, a deviation threshold Yth1 (where Yth1<Yth) different from the deviation threshold Yth may be used as the deviation threshold to be used in determining whether the understeer state of the vehicle is canceled or not.

With this configuration, a variation in determination results, that is, a so-called hunting phenomenon, can be prevented in acquiring behavior information including an understeer state of a vehicle.

Lastly, in the example described in the embodiment of the present disclosure, the travel control section 35 performs travel control of accelerating the vehicle so that the vehicle velocity V of the user's vehicle follows a predetermined vehicle velocity in a case where the user's vehicle is in a straight-ahead state. However, the present disclosure is not limited to this example. For example, a configuration in which travel control of accelerating the vehicle so that the vehicle velocity V of the user's vehicle follows a predetermined vehicle velocity in a case where the user's vehicle is in a straight-ahead state and the deviation Yd between the actual yaw rate Yr and the neutral yaw rate Yn is converged to a value less than or equal to deviation threshold Yth2 (where Yth2<Yth1<Yth) different from the deviation threshold Yth may be employed. With this configuration, travel control for more stable behavior of a vehicle can be more appropriately performed. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle travel control device comprising:

a neutral characteristic setting controller configured to set a vehicle velocity-neutral yaw rate characteristic such that the vehicle velocity-neutral yaw rate characteristic where a behavior of a vehicle is in a neutral state is previously set based on a vehicle velocity and a steering angle of the vehicle;

a behavior information acquisition controller configured to acquire behavior information including an understeer state of the vehicle based on an actual yaw rate detected by an actual yaw rate detector, a vehicle velocity detected by a vehicle velocity detector, a steering angle detected by a steering angle detector, and the vehicle velocity-neutral yaw rate characteristic previously set by the neutral characteristic setting controller; and a travel controller configured to perform travel control so that the vehicle velocity of the vehicle follows a predetermined vehicle velocity, wherein the behavior information acquisition controller determines whether a deviation between the actual yaw rate and a neutral yaw rate exceeds a predetermined deviation threshold, wherein the neutral yaw rate being obtained by using the vehicle velocity, the steering angle, and the vehicle velocity-neutral yaw rate characteristic, and the behavior information acquisition controller determines that the vehicle is in an understeer state when the deviation exceeds the predetermined deviation threshold, and the travel controller performs the travel control of the vehicle using the behavior information acquired by the behavior information acquisition controller.

2. The vehicle travel control device according to claim 1, wherein the travel controller performs, in a case where the deviation exceeds the deviation threshold, travel control of decelerating the vehicle to a vehicle velocity with which the deviation between the actual yaw rate and the neutral yaw rate follows the deviation threshold.

3. The vehicle travel control device according to claim 2, wherein the travel controller performs travel control of accelerating the vehicle so that the vehicle velocity follows a predetermined vehicle velocity in a case where the vehicle is in a straight-ahead state.

4. The vehicle travel control device according to claim 1, wherein the vehicle velocity-neutral yaw rate characteristic is set per steering angle.

5. The vehicle travel control device according to claim 4, wherein the vehicle velocity-neutral yaw rate characteristic defines the neutral yaw rate per steering angle.

6. The vehicle travel control device according to claim 5, wherein the neutral yaw rate is a linear function of the vehicle speed.

7. The vehicle travel control device according to claim 1, wherein the vehicle velocity-neutral yaw rate characteristic defines the neutral yaw rate, and wherein the neutral yaw rate is a linear function of the vehicle speed and the steering angle.

8. The vehicle travel control device according to claim 1, wherein the neutral characteristic setting controller includes a storage device storing the vehicle velocity-neutral yaw rate characteristic.

9. A vehicle comprising the vehicle travel control device according to claim 1.

10. The vehicle travel control device according to claim 1, wherein the actual yaw rate detector is a yaw rate sensor, the vehicle velocity detector is a vehicle velocity sensor, and the steering angle detector is a steering angle sensor.

11. The vehicle travel control device according to claim 1, wherein the behavior information acquisition controller calculates the neutral yaw rate using current vehicle velocity, current steering angle, and the vehicle velocity-neutral yaw rate characteristic.

12. The vehicle travel control device according to claim 1, further comprising a determination controller determining whether a cruise control switch is on state or not, wherein when it is determined by the determination controller that the cruise control switch is not on state, the travel controller does not perform the travel control of the vehicle using the behavior information acquired by the behavior information acquisition controller, and when it is determined by the determination controller that the cruise control switch is on state, the travel controller performs the travel control of the vehicle using the behavior information acquired by the behavior information acquisition controller.

13. The vehicle travel control device according to claim 1, wherein the vehicle velocity-neutral yaw rate characteristic previously set in the neutral characteristic setting controller is of linear characteristic passing through an origin where the vehicle velocity is zero and the neutral yaw rate is zero.

14. A vehicle travel control method comprising:

setting and storing in a storage device a vehicle velocity-neutral yaw rate characteristic where a behavior of a vehicle is in a neutral state, based on a vehicle velocity and a steering angle of the vehicle;

acquiring, by using a computer, a behavior information including an understeer state of the vehicle based on an actual yaw rate detected by an actual yaw rate detector, a vehicle velocity detected by a vehicle velocity detector, a steering angle detected by a steering angle detector, and the vehicle velocity-neutral yaw rate characteristic, wherein the acquiring step determines whether a deviation between the actual yaw rate and a neutral yaw rate exceeds a predetermined deviation threshold, wherein the neutral yaw rate being obtained by using the vehicle velocity, the steering angle, and the vehicle velocity-neutral yaw rate characteristic, and if so, determines that the vehicle is in an understeer state; and performing, by using a computer, travel control of the vehicle using the acquired behavior information so that the vehicle velocity of the vehicle follows a predetermined vehicle velocity.

* * * * *